Patented Feb. 17, 1925.

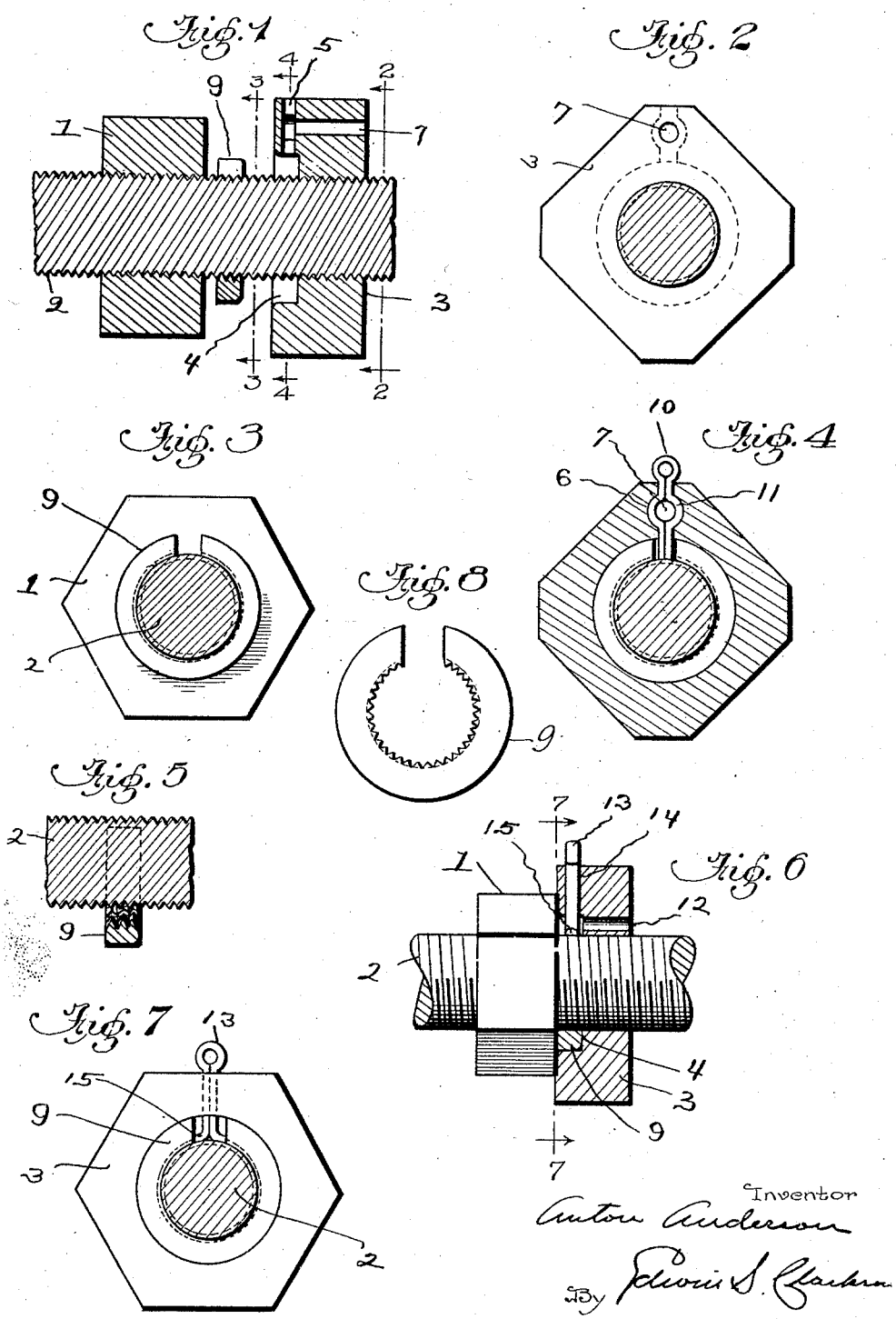

UNITED STATES PATENT OFFICE.

ANTON ANDERSON, OF PORTLAND, OREGON.

NUT LOCK.

Application filed April 17, 1924. Serial No. 707,155.

*To all whom it may concern:*

Be it known that I, ANTON ANDERSON, a citizen of the United States of America, residing at Portland, in the county of Multnomah and State of Oregon, have invented certain new and useful Improvements in Nut Locks, of which the following is a specification.

The object of my invention is to provide a simple and cheap, but effective nut lock which can be readily manufactured and readily applied; with this and other objects in view, my invention consists of the parts and combinations of parts as will be hereinafter more fully set forth.

In the drawings:

Figure 1 is a sectional view showing my improved nut and washer assembled on a bolt, but in unlocked position.

Figure 2 is a sectional view on the line 2—2, Figure 1, looking in the direction of the arrow.

Figure 3 is a sectional view on the line 3—3, Figure 1, looking in the direction of the arrow.

Figure 4 is a sectional view on the line 4—4, Figure 1, looking in the direction of the arrow.

Figure 5 is a detail sectional view through the bolt and washer.

Figure 6 is a side elevation, partly in section, showing a nut lock assembly of another embodiment of my invention.

Figure 7 is a sectional view on the line 7—7, Figure 6, looking in the direction of the arrow.

Figure 8 is a side elevation of the washer.

The reference numeral 1 designates a nut of usual construction threaded on the bolt 2. My improved nut lock 3 is provided in its inner face with a recess 4 surrounding the threaded opening of the nut, from which recess extends a port 5 through the periphery of the nut. This port has an enlarged recess 6 in diametrically opposite walls thereof. 7 is a port extending from the face of the nut and intercepting at right angles the port 5 and opening into the recess 6 of the port 5. 9 is an interrupted, or split, washer, the screw threads of which are deeper than the standard threads on the bolt 2 whereby there may be a screw threaded engagement between the washer and the bolt without injury to the standard threads of the bolt, but being remembered that in the assembly of the parts there is a certain amount of pressure on one side of the washer when the nut 3 is screwed to place. This washer 9 is designed to fit bodily in the recess 4 of the nut 3 with the gap or interruption in it positioned opposite the port 5 of the nut 3 so that when the nut 3 is firmly threaded into locked position a cotter pin 10 may be passed through the port 5 with its ends extending into the recess 4 and between the ends of the washer 9 as more clearly shown in Figure 4. When the cotter pin is in this position a suitable tool is passed through the port 7 between the legs of the cotter pin whereby the legs of the cotter pin are spread, as at 11, Figure 4, to fill the recess 6 whereby the cotter pin is locked against accidental displacement from the nut 3. When the parts are assembled, as shown in Figure 4, the washer 9 is held against rotation by reason of its ends engaging the inner end of the cotter pin, and as the nut 3 is locked by the cotter pin to the washer 9 there can be no relative rotation between the nut 3 and the washer 9. Any vibration cannot loosen the nut and washer because any body relative movement between the washer 9 and the nut 3, by reason of the deeper threads in the washer 9, would tend to make the threads in the washer 9 tangent to the threads of the bolt 2, and thus prevent any material loosening of the nut 3.

In Figures 6 and 7 I have shown another embodiment of my invention and I have marked similar parts with the same reference numeral I have used in the other figures in the drawings. In these two figures it will be noted that the port 12 in the nut 3 at its inner end opens directly in to the washer recess 4 so that after the cotter pin 13 has been fully inserted in the port 14 a suitable tool may be passed through the port 12 into the recess 4 and between the legs of the cotter pin whereby the ends of the legs of the cotter pin can be spread apart as at 15, more clearly shown in Figure 7, thereby locking the cotter pin between the ends of the washer 9 and preventing its accidental removal from the port 14.

Of course, it is obvious that changes may be made in the details of construction within the spirit of my invention and within the scope of the appended claims.

The washer 9 before being threaded is provided with grooves extending transversely. This washer is made of suitably tempered metal.

What I claim is:

1. In a nut lock a nut having a recess in one of its faces surrounding its threaded opening, a port extending from an opposite face of the nut into said recess, and a port extending from an edge of the nut into said recess and at right angles to the other port, and an interrupted washer adapted to be seated in said recess with its interruption registering with the port extending from the edge of the nut, said washer having screw threads in its inner edge and means coacting with said parts to prevent relative movement thereof.

2. In a nut lock a nut having a recess in one of its faces surrounding its threaded opening, a port extending from an opposite face of the nut into said recess, and a port extending from an edge of the nut into said recess and at right angles to the other port, and an interrupted washer adapted to be seated in said recess with its interruption registering with the port extending from the edge of the nut, said washer having screw threads in its inner edge of greater depth than the screw threads of the nut and means cooperating with said recess and washer to prevent relative movement of the parts.

3. In a nut lock, the combination with a nut having a recess in its bottom face surrounding its screw threaded opening, a port leading from the upper face into said recess, and a port leading from one side edge of the nut into said recess, an interrupted washer adapted to be seated in said recess with its interruption registering the said edge port, said washer having screw threads deeper than the screw threads of the nut, and a cotter pin adapted to pass through said edge port and positioned with its ends between the ends of the washer, the cotter pin intermediate its ends being adapted to be spread by an instrument passed through the port leading from the front face of the nut.

4. In a nut lock, the combination with a nut having a recess in its bottom face surrounding its screw threaded opening, a port leading from the upper face into said recess, and a port leading from one side edge of the nut into said recess, an interrupted washer adapted to be seated in said recess with its interruption registering the said edge port, said washer having screw threads deeper than the screw threads of the nut, and a cotter pin adapted to pass through said edge port and positioned with its ends between the ends of the washer.

In testimony whereof I affix my signature.

ANTON ANDERSON.